United States Patent
Johnsen et al.

(10) Patent No.: US 12,128,995 B2
(45) Date of Patent: Oct. 29, 2024

(54) MINIMIZING MOVEMENTS OF OFFSHORE WIND TURBINES

(71) Applicant: Entrion Wind, Inc., Houston, TX (US)

(72) Inventors: Eivind Johnsen, Houston, TX (US); Li Lee, San Diego, CA (US)

(73) Assignee: Entrion Wind, Inc., Houston, TX (US)

( * ) Notice: Subject to any disclaimer, the term of this patent is extended or adjusted under 35 U.S.C. 154(b) by 860 days.

(21) Appl. No.: 17/249,676

(22) Filed: Mar. 9, 2021

(65) Prior Publication Data

US 2022/0126957 A1    Apr. 28, 2022

Related U.S. Application Data

(60) Provisional application No. 63/104,695, filed on Oct. 23, 2020.

(51) Int. Cl.
*B63B 35/44* (2006.01)
*B63B 21/50* (2006.01)
*B63B 39/00* (2006.01)

(52) U.S. Cl.
CPC .......... *B63B 39/005* (2013.01); *B63B 21/502* (2013.01); *B63B 35/44* (2013.01); *B63B 2021/504* (2013.01); *B63B 2021/505* (2013.01); *B63B 2035/446* (2013.01)

(58) Field of Classification Search
CPC ..... B63B 35/44; B63B 39/005; B63B 21/502; B63B 2021/504; B63B 2021/505
See application file for complete search history.

(56) References Cited

U.S. PATENT DOCUMENTS

| | | | | |
|---|---|---|---|---|
| 10,518,846 B2 * | 12/2019 | Dagher | ................ | F03D 3/005 |
| 11,014,637 B2 * | 5/2021 | Boo | ...................... | B63B 39/06 |
| 2009/0072544 A1 * | 3/2009 | Pao | ........................ | B63B 21/16 |
| | | | | 290/55 |
| 2013/0224020 A1 * | 8/2013 | Dagher | .................. | F03D 13/25 |
| | | | | 416/84 |
| 2013/0233231 A1 * | 9/2013 | Dagher | .................. | B63B 75/00 |
| | | | | 114/265 |
| 2016/0341182 A1 * | 11/2016 | Dagher | ................ | B63B 21/502 |

(Continued)

FOREIGN PATENT DOCUMENTS

| | | | | |
|---|---|---|---|---|
| CN | 103291546 A | | 9/2013 | |
| EP | 2708742 A1 * | | 3/2014 | ........... B63B 21/502 |

(Continued)

OTHER PUBLICATIONS

International Search Report and Written Opinion for PCT Application No. PCT/US21/51433, mailed Feb. 24, 2022, 8 pages.

*Primary Examiner* — S. Joseph Morano
*Assistant Examiner* — Jovon E Hayes
(74) *Attorney, Agent, or Firm* — Lee & Hayes, P.C.

(57) ABSTRACT

Techniques are disclosed herein for minimizing movement of an offshore wind turbine. Using the technologies described, a wind turbine may be mounted on a marine platform that is constructed and deployed to reduce environmental loads (e.g., wind, waves, . . . ) on the platform in both shallow and deep water. In some configurations, a fully restrained platform (FRP) is configured to support a wind turbine. According to some examples, moorings are attached to the FRP and/or the structure of the wind turbine structure to reduce movement in six degrees of freedom.

20 Claims, 17 Drawing Sheets

(56) References Cited

U.S. PATENT DOCUMENTS

| | | | | |
|---|---|---|---|---|
| 2017/0356423 | A1* | 12/2017 | Galdos Tobalina | F03D 9/30 |
| 2018/0149137 | A1* | 5/2018 | Nordstrom | F03D 9/255 |
| 2019/0078556 | A1* | 3/2019 | Stiesdal | B63B 21/502 |
| 2020/0010155 | A1* | 1/2020 | Robinson | F03D 9/008 |
| 2020/0269960 | A1* | 8/2020 | Boo | B63B 39/00 |
| 2020/0307745 | A1* | 10/2020 | Aguire Suso | B63B 39/03 |
| 2021/0108612 | A1* | 4/2021 | Foster | F03B 13/187 |
| 2021/0269126 | A1* | 9/2021 | Allen | B63B 79/15 |
| 2021/0276673 | A1* | 9/2021 | Boo | B63B 35/44 |
| 2021/0387702 | A1* | 12/2021 | Allen | B63B 39/02 |
| 2022/0060009 | A1* | 2/2022 | Godreau | H02G 9/12 |
| 2022/0126957 | A1* | 4/2022 | Johnsen | B63B 35/44 |
| 2022/0128028 | A1* | 4/2022 | Liebman | F03D 13/20 |
| 2022/0411025 | A1* | 12/2022 | Chang | B63B 21/20 |
| 2023/0159141 | A1* | 5/2023 | Viselli | B63B 21/50 |
| | | | | 114/122 |

FOREIGN PATENT DOCUMENTS

| | | | | |
|---|---|---|---|---|
| JP | 2011245879 A | * | 12/2011 | B63B 21/502 |
| WO | WO-2019076586 A1 | * | 4/2019 | E02D 27/42 |
| WO | WO-2021211121 A1 | * | 10/2021 | B63B 1/107 |

* cited by examiner

900

$$\begin{vmatrix} K_1 + K_2 - M_1\omega^2 & -K_2 & 0 \\ -K_2 & K_2 + K_3 - M_2\omega^2 & -K_3 \\ 0 & -K_3 & K_3 - M_3\omega^2 \end{vmatrix} = 0$$

FIG. 9

MINIMIZING MOVEMENTS OF OFFSHORE WIND TURBINES

CROSS-REFERENCE TO RELATED APPLICATIONS

This application claims priority to U.S. Provisional Patent Application No. 63/104,695 entitled "Stationary Offshore Wind Turbines," filed Oct. 23, 2020, which is incorporated herein by reference in its entirety.

BACKGROUND

Deep-water regions off coastlines offer tremendous potential as wind power resources. Marine structures, commonly termed as platforms, may be used for hosting wind turbines and associated electrical equipment in these areas. Determining how to reduce movement of the marine platform to support wind turbines, however, can be challenging. In an open ocean, winds, waves, and currents often act simultaneously and exert forces on the marine platforms causing the platforms to move.

BRIEF DESCRIPTION OF THE DRAWINGS

FIG. 9 illustrates an eigenvalue equation to obtain natural frequencies.

DETAILED DESCRIPTION

Figure 1:
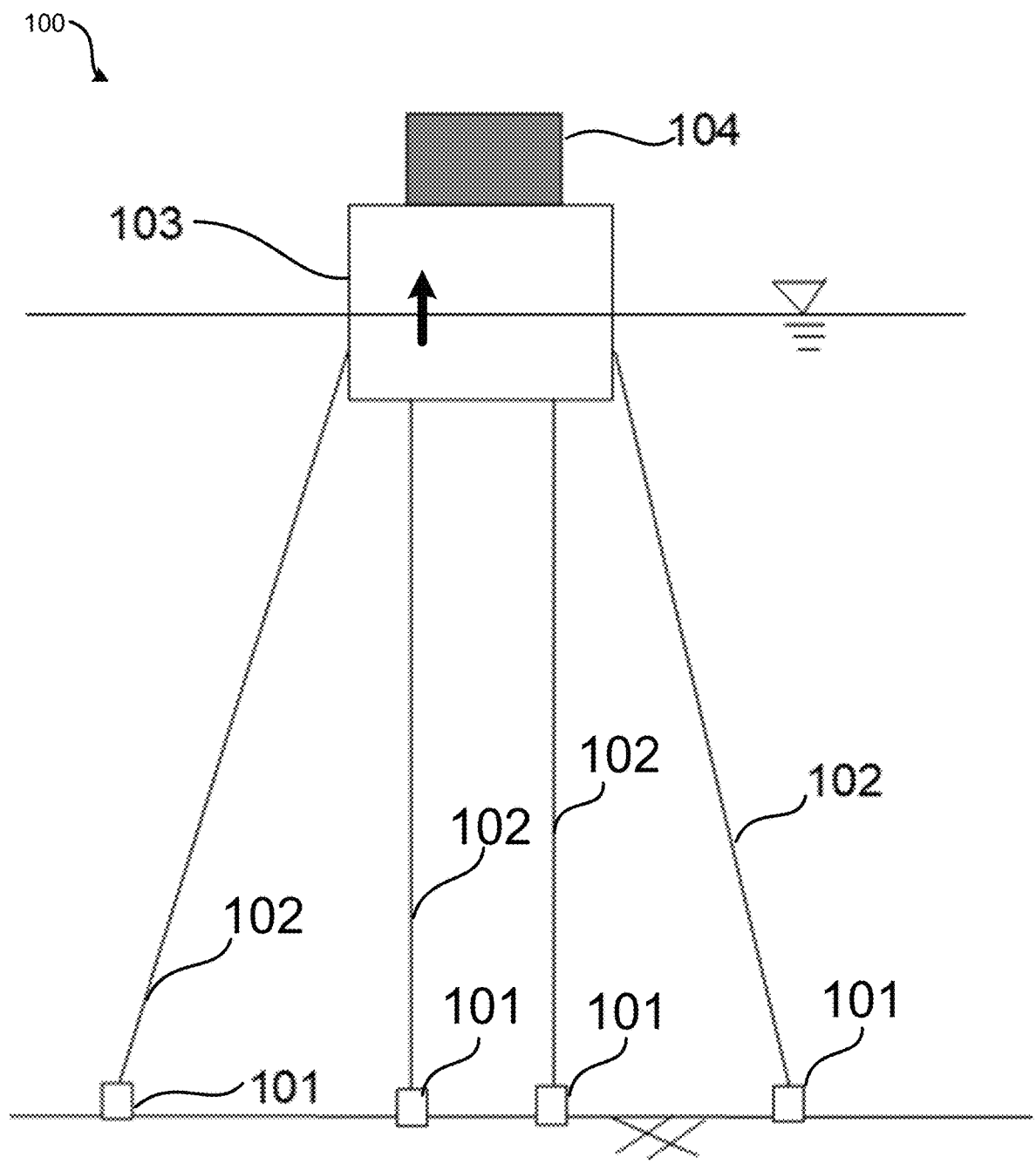
FIG. 1 illustrates a schematic using moorings to restrain a buoyant structure with a deck to support a wind turbine.

The following detailed description is directed to technologies for minimizing movement of an offshore wind turbine. Using the technologies described herein, a wind turbine may be mounted on a marine platform that is constructed and deployed to reduce movements and/or environmental loads (e.g., wind, waves, . . . ) on the platform in both shallow water (e.g., less than 120 meters) and deep water (e.g., greater than 40 meters). According used herein, the terms fully restrained platform (FRP) refers to a platform that has motions restrained in 6 degrees-of-freedom (DOFs), FRP-monopoile refers to a platform that includes a monopile, and the term FRP-monohull refers to a platform that includes a buoyant structure.

For purposes of explanation, the main structural component of a platform can be viewed as a rigid body. Its motions are characterized by and measured in 6 degrees-of-freedom (DOFs) including three translational (surge, sway and heave), and three rotational (roll, pitch, and yaw). The environmental loads can force the platform to move in one or more DOFs. Some of these loads are dynamic in nature such as those from the water waves, others are mainly steady such as the ocean current induced drag.

One example platform design philosophy is that in shallow waters, the environmental loads are mainly resisted by the lateral stiffness of the platform, which is designed to be "fixed". One such example is the jacket platform which is a lattice structure with its legs extending into the earth. In deeper waters, however, the amount of material required for a fixed platform is uneconomical. Platform concepts therefore have some or all of the 6 DOFs' motions that are allowed, such as in the case of a tension-leg platform (TLP) in which surge, sway, and yaw motions are allowed, and a semisubmersible platform in which all of the 6 DOF motions allowed.

In current wind engineering practice, fixed ocean platforms, such as jackets, are used for shallow water regions where the water depth is less than 60 meters. However, regions that have ample winds are often located in deeper ocean, where the water depth is over 60 meters and beyond.

Offshore platforms in significantly deeper waters (such as 1000 meters) have been installed by the offshore oil and gas industry. There are mainly four types of such marine structures: (1) the tension-leg platform (TLP), such as that disclosed in U.S. Pat. No. 3,577,946, (2) the spar platform (spar), such as that disclosed in U.S. Pat. No. 4,702,321, (3) the semisubmersible, and (4) the moored ship-hull platform. A common feature of these four types of structure is that under the environmental loads, all of them will have large excursions in a storm or a strong ocean current event: as high as 5-8% of the water depth.

For a wind turbine to function effectively, it is desirable that its host structure has as little movement as possible. According to examples described herein, a wind turbine is supported by a platform that attempts to minimize motions in all of its 6 DOFs such that power generation by the wind turbine is more effective as compared to platforms that do not restrain all 6 DOFs. Prior to techniques described herein, no known platforms which possess such a feature have been permanently installed in deep-waters to host wind turbines.

The payload of a wind turbine is significantly less than a payload of a typical offshore oil and gas application, and the water depth for wind applications in a foreseeable future is not as great as that routinely faced by the offshore oil and gas industry. As described herein, a marine structure is disclosed that reduces/minimizes motions in water (e.g., depths of 60 meters and beyond) that hosts a wind turbine and associated structures and equipment.

An offshore wind turbine is a wind turbine mounted on an offshore platform. On offshore wind turbine (e.g., in water depth over 60 m) generally includes four main components: (1) the anchors on the seabed, (2) the mooring lines, (3) the buoyant structure (also termed as "hull" or "air can") with deck(s) (alternatively a structure termed as "transition piece") on its top, and (4) the wind turbine, which has a tower, a nacelle, and a rotor hub with blades. The moorings can be connected at one end to the anchors on the seafloor, and at another end to the hull and/or the wind tower. According to some examples, the first three components (the anchors on the seabed, the mooring lines, and the buoyant structure) comprise the offshore platform. The base of the wind turbine is mounted on the offshore platform, such as on a deck of the offshore platform. In addition to a wind turbine, other structures and equipment can also be mounted on the platform.

Using the techniques described herein, the motions in all of the 6 DOFs of an offshore wind turbine may be reduced/restrained. The motions referred to herein are those of the hull caused by the environmental loading. The external forces causing the motions include those from waves and ocean currents on the hull, the moorings along with any part of the turbine in contact with water, and from winds on any part of the structure above the sea surface. Methods for the assembly, transportation, installation, and the development of the adjacent wind turbine units are also disclosed. Additional details regarding minimizing motion of an offshore wind turbine will be presented below with regard to FIGS. 1-15.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 illustrates a schematic 100 using moorings to restrain a buoyant structure with a deck to support a wind turbine (termed herein as first method). According to some configurations, moorings to restrain the hull are configured to minimize the motion of the structure including the turbine. The schematic 100 illustrates an example of an FRP-monohull.

As illustrated in FIG. 1, the buoyant structure with deck(s) 103 provides a buoyant force upward as indicated by the arrow within the area of 103. The moorings 102, some of which are vertical and others of which are inclined at an angle from vertical, pull the buoyant structure 103 downward. The other end of the moorings 102 is connected to the seabed anchors 101. According to some examples, the moorings may include a conduit. For example, the moorings may be tubular (or some other shape) that includes a conduit for the transfer of fluids, cables (e.g., electrical, communication, . . . , and the like. In other configurations, the moorings may be tubular and include vortex induced vibration suppression hardware, such as helical strakes and fairings, are fitted on to mitigate vortex-induced vibration.

The weight of the wind turbine and/or other structures and equipment 104, termed as a payload, is also applying downward force. The equilibrium of the forces in the vertical direction is achieved by the buoyancy of the hull being equal to the sum of the pulling force from the moorings and the weight of the wind turbine and/or electrical equipment other structures and equipment. The above description is applicable for a still water scenario.

When there are disturbances, the environmental loads will tend to move the hull 103 away from its still water position. In the vertical and horizontal directions, the moorings 102 will be stretched and will thus provide resistance to the movement. The action of the moorings 102 applies to both steadily static and dynamic loading. This helps to restrain the translational motions of the hull, surge, sway, and heave.

Figure 2:
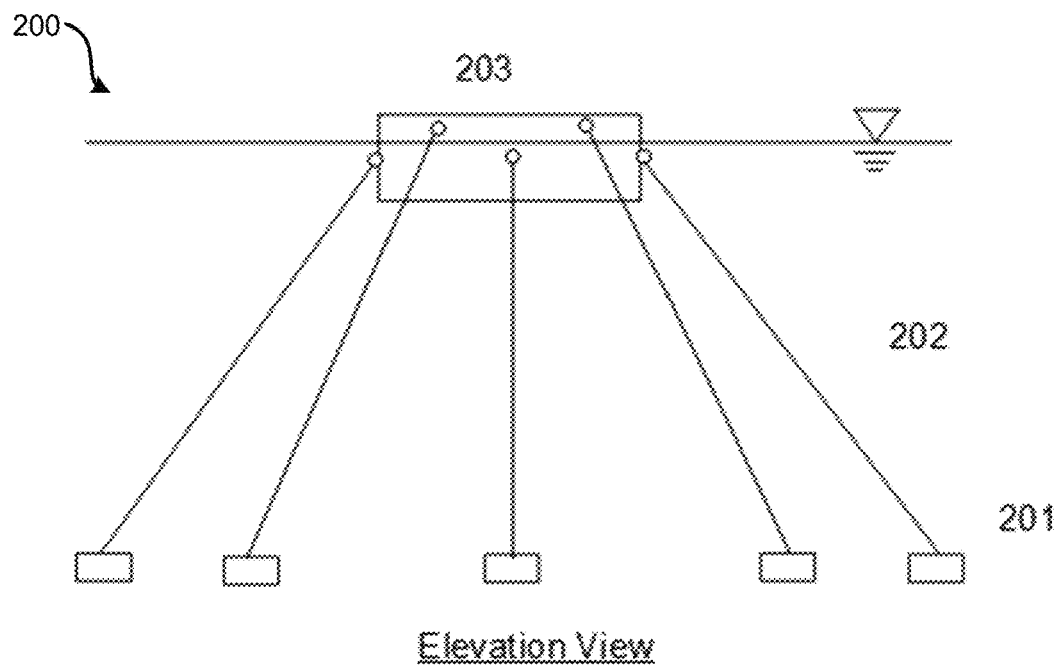
FIG. 2 shows an elevation view and a plan view that illustrates how rotational motions of the hull are restrained.
Figure 2:
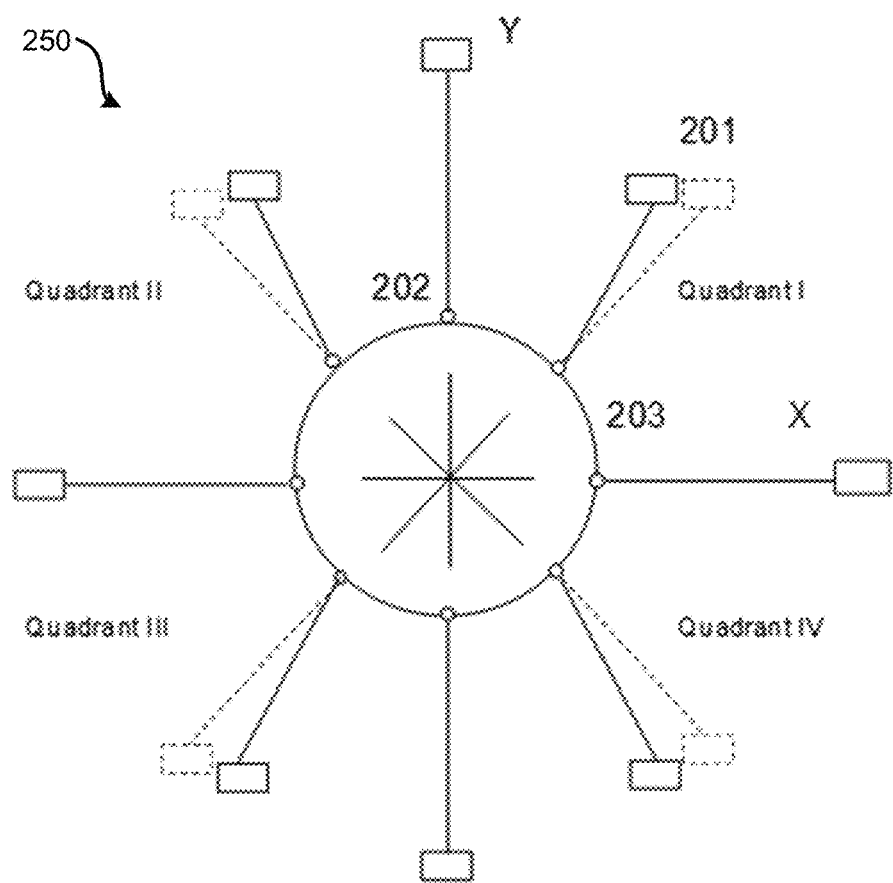

FIG. 2 shows an elevation view 200 and a plan view 250 that illustrates how rotational motions of the hull can be restrained. In the illustrated example of FIG. 2, there are a total of 8 moorings 202 with 4 at each elevation on the hull. A different number of moorings may be utilized in other examples. The hull 203 is secured by moorings 202. The other end of the moorings 202 is connected to anchors 201 on the seabed.

The hull 203 has three rotational motions: two about the horizontal axes (roll and pitch) and one about the vertical axis (yaw). According to some configurations, to restrain the roll and pitch motions of the hull 203, the moorings 202 are attached at two different elevations on the hull 203 (as shown in the elevation view 200 in FIG. 2).

A portion of the moorings 202 are at a lower elevation (as is shown inside the water) and other moorings 202 are at higher elevation (as is shown outside of the water). By restraining the motions as illustrated in FIG. 2, rotations about a horizontal axis will stretch the moorings 202 and will be resisted by the axial stiffness of the moorings 202.

As shown in the plan view 250 of FIG. 2, the moorings 202 at lower elevation on the hull 203 are configured so that the pairs which are 180-degree apart are on the same line. Two moorings 202 align with the X axis and two moorings 202 align with the Y axis. Therefore, the four moorings at this elevation are at 0, 90, 180, and 270 degrees (other degrees can be used). The imaginary extension of each of them will pass through the origin of the X-Y coordinate system, according to some examples.

The mooring 202 attachments at the upper elevation can also be seen in the plan view 250 of FIG. 2. For purposes of explanation, assume that the mooring attachments are originally at 45, 135, 225, and 315 degrees (in dashed lines). When connecting the pair of moorings 180-degree apart, the line passes through the origin of the X-Y coordinate system. Now, rotate each mooring line about its attachment point in the horizontal plane as follows: the moorings in Quadrants I and III counterclockwise by, say, 10 degrees, and the moorings in Quadrants II and IV clockwise, also by 10 degrees.

After the rotation, the moorings 202 attached to the upper elevation on the hull 203 are shown in solid lines. The two originally 180-degree apart mooring will no longer be on the same line, and the imaginary extension of each will not pass through the origin. A moment arm is therefore created. When there is a yaw motion, either clockwise or counterclockwise, some of the moorings 202 will be stretched and will provide resistance. More specifically, the moorings in Quadrants I and III provide resistance to a clockwise yaw motion, and the moorings in Quadrants II and IV provide resistance to a counterclockwise yaw motion.

Even though vertically attached moorings 202 also restrain translational motion heave and rotational motions roll and pitch as in the case of a TLP, the inclined moorings attached to the hull at different elevations can also restrain surge and sway, in addition to heave, roll and pitch.

As described above, the hull 203 can be restrained in 6 DOFs. Any motions in its 6 DOFs, namely, surge, sway, heave, roll, pitch, and yaw, will be resisted by the axial stiffness of the moorings 202. The axial stiffness of a mooring line will be dependent upon the Young's modulus of the mooring material, the cross-sectional area of the mooring, and the length of the mooring. A properly sized mooring system can reduce the motions of the hull to the minimum.

Figure 3:
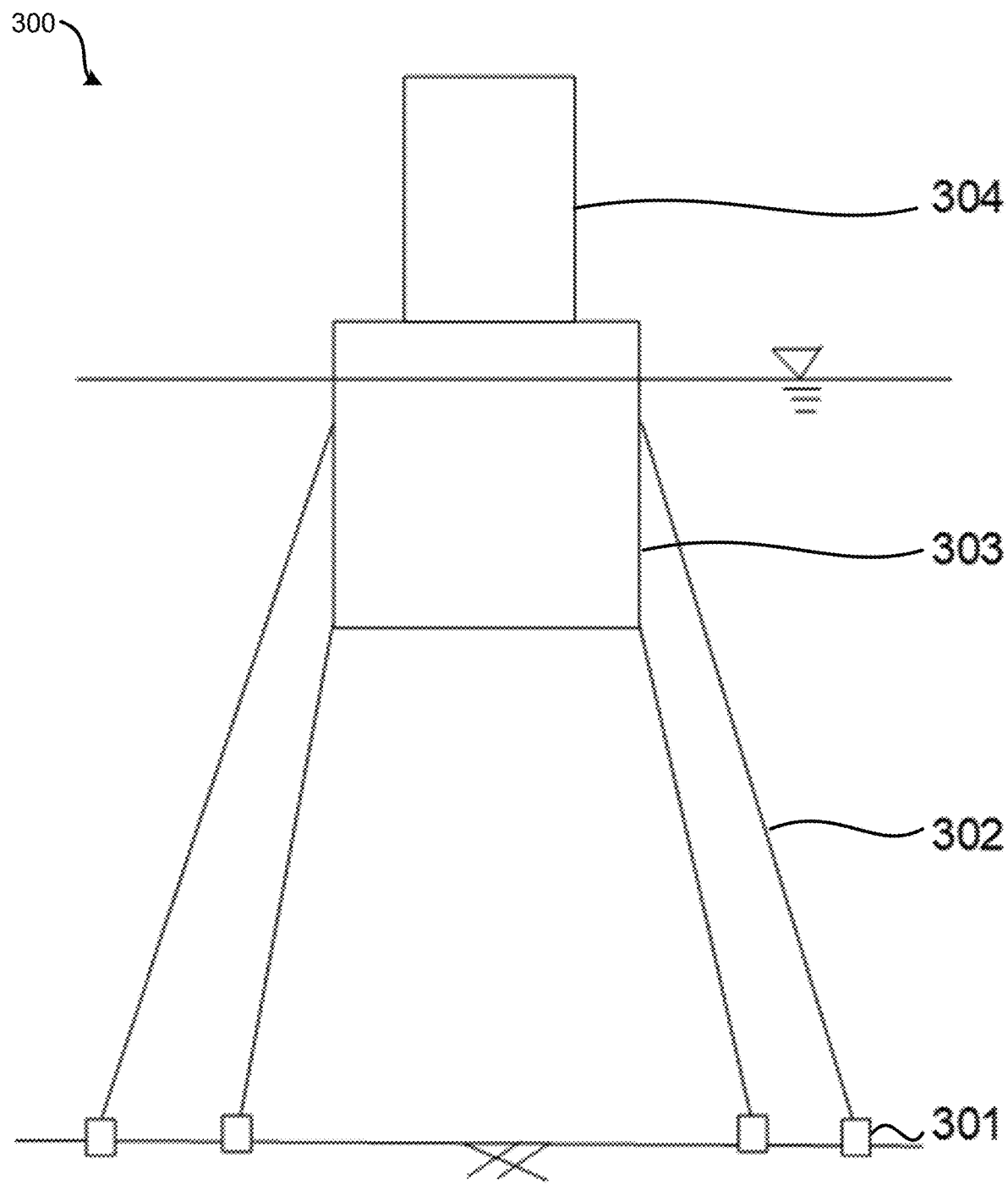
FIG. 3 shows a schematic 300 for configuring an offshore platform for supporting a wind turbine.

FIG. 3 shows a schematic 300 for configuring an offshore platform for supporting a wind turbine. Moorings 302 are at one of their ends connected to seabed anchors 301, and at the other ends to the buoyant structure and deck 303 at one elevation for some and at another elevation for others. The wind turbine tower and/or electrical equipment such as a transformer 304 can be mounted rigidly on top of the buoyant structure and deck 303. By using techniques described above in FIG. 1 and FIG. 2. to design and place the moorings 302, the buoyant structure and deck 303 can be restrained to minimize movement in 6 DOFs.

Figure 4A:
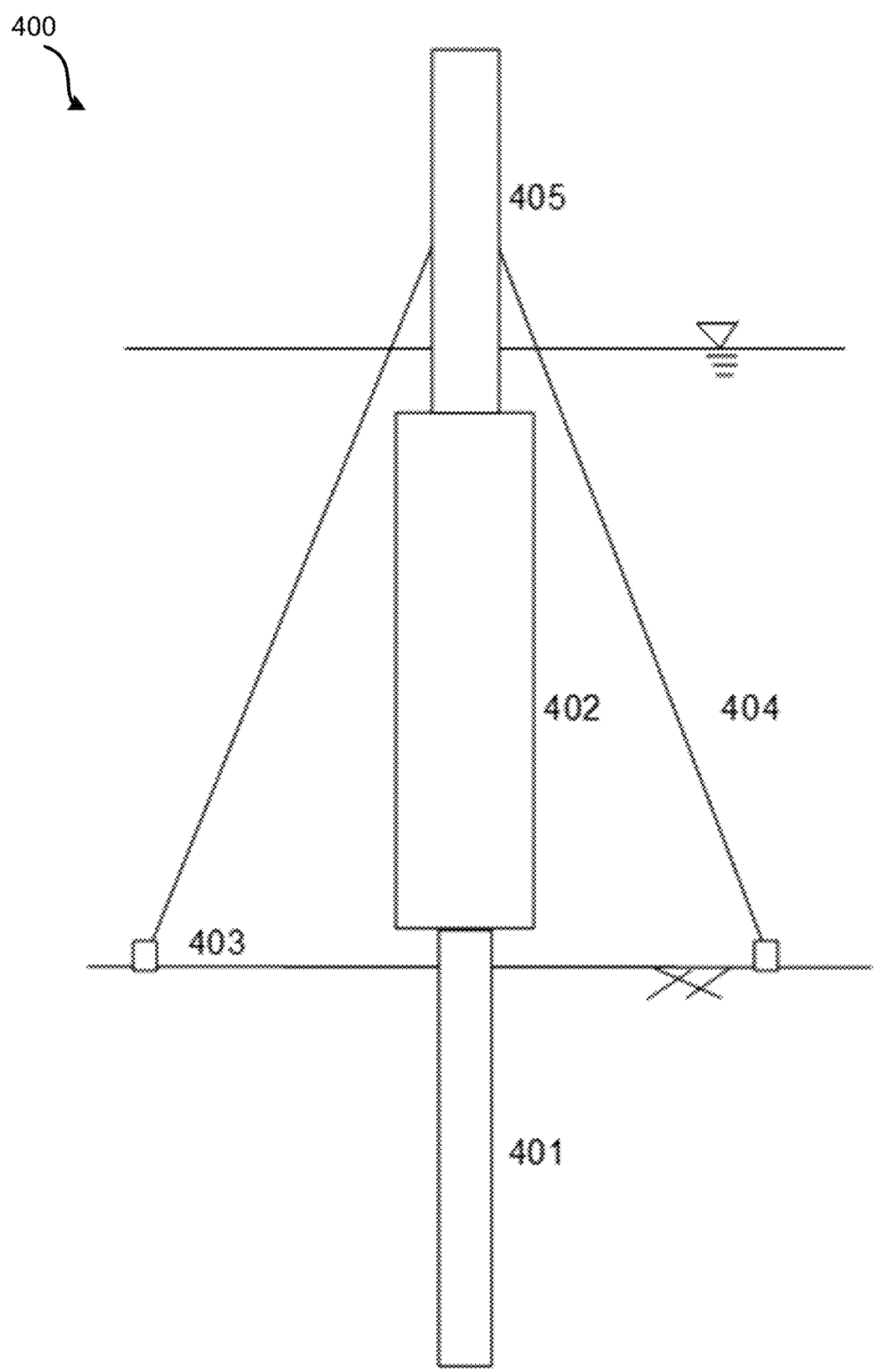
FIG. 4A shows a schematic of a fully restrained platform (FRP) for supporting a wind turbine.

FIG. 4A shows a schematic 400 of a fully restrained platform (FRP) for supporting a wind turbine. According to some examples, the FRP may be placed in waters that are not significantly deep (e.g., 60-120 meters deep). As a pile is used to assist in restraining the hull movement, as discussed briefly above, it may be referred to herein as an FRP-monopile.

As illustrated, the FRP-monopile structure includes different components. In some configurations, an FRP-monopile includes a monopile 401 driven into the seabed, a transition piece placed on top of the monopile, and one or more moorings 404, and one or more mooring anchors 403.

This composition of an FRP-monopile can be tailored to suit the needs of the specific design, transportation and installation. For example, the monopile 401 can be separated into two segments in its longitudinal direction with the upper segment having a different dimension from the lower one, so that the buoyancy of the structure can be designed to improve the structure's performance, by pre-tensioning the moorings 404 and optimizing the axial load of the monopile 401.

Figure 4B:
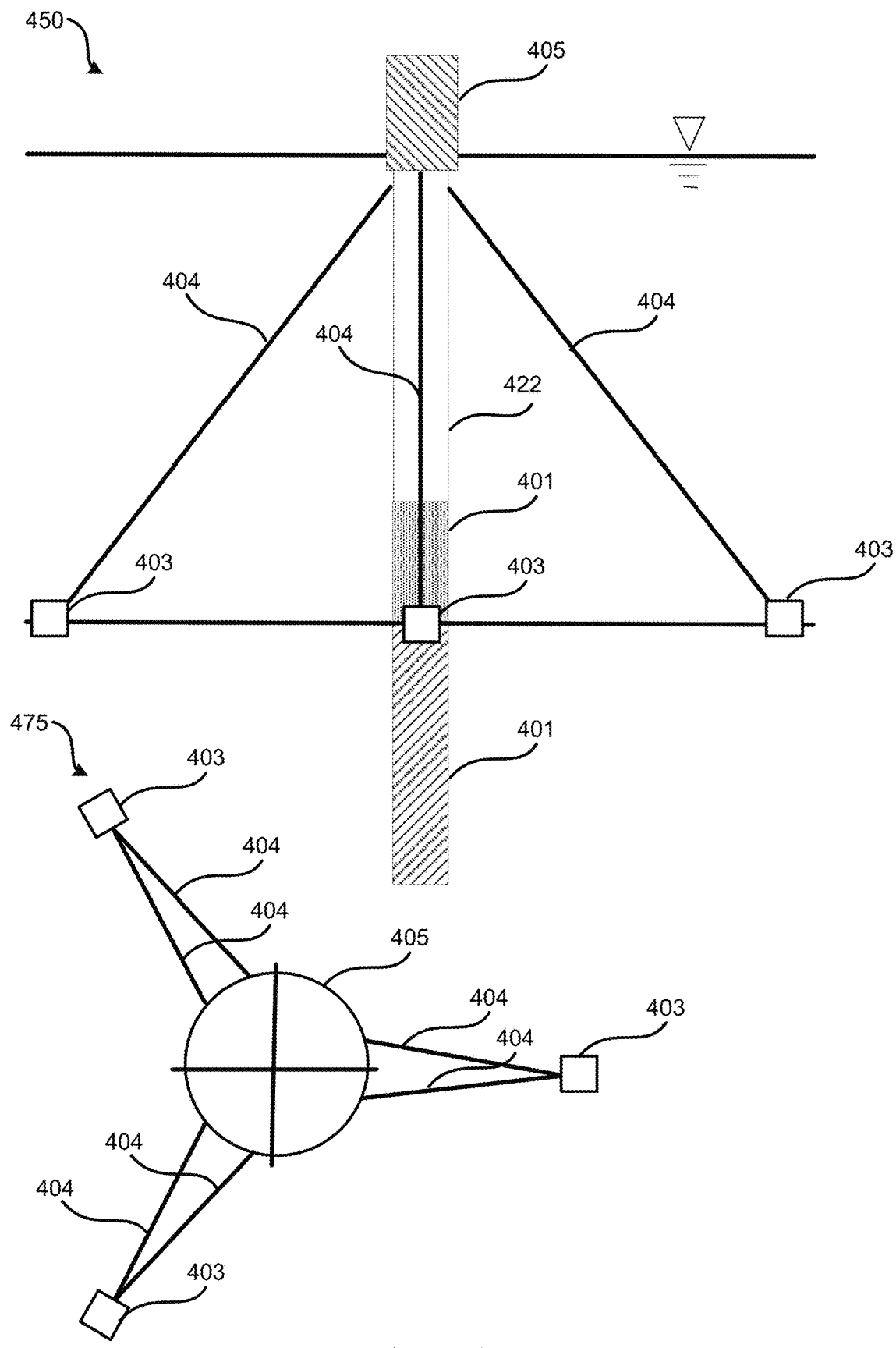
FIG. 4B shows a schematic of a fully restrained platform (FRP) that includes a monopile and air can in one piece for supporting a wind turbine.

The buoyant structure and deck 402 may be designed to have different forms/shapes. As illustrated in FIG. 4A, the buoyant structure and deck 402 has a different structural dimension (e.g., larger in this example, but may be smaller), and may/may not include a deck, which may also be referred to as a "transition piece" at is upper end. As illustrated in FIG. 4B, the monopile 401 includes an integrated buoyant structure 422, or air can. The buoyancy of the air can exert a lift on the pile 401. Depending on the magnitude of the payload, the top of the pile 401 can be in tension or in compression. According to some examples, vortex-induced vibration (VIV) suppression hardware may be used on pile 401 and/or air can structure to mitigate VIV.

As illustrated, one or more piles 401 are driven into the seabed, which is pulled upward toward the sky by a buoyant structure and deck 402. The top of the pile 401 including the deck/transition piece 403 can be some distance above the seabed. A wind turbine tower and/or electrical equipment 405 and/or other payload can be mounted rigidly on top of the buoyant structure and deck 402. According to some configurations, the moorings 404 are at one of their ends connected to seabed anchors 403, and at the other ends to the tower 405. The payload (that includes the weight of the wind turbine and/or electrical equipment) is supported by the buoyant structure and deck 402. According to other configurations, the moorings 404 are at one of their ends connected to seabed anchors, and at the other ends to the buoyant structure and deck 402. According to yet other examples, no moorings may be used to assist in restraining the motion. For example, in shallow waters (e.g., water depth of 0-60 meters, 0-120 meters), an FRP-monopile may not use moorings 404.

According to some examples, the attachment elevation of one end of the moorings 404 are attached on the wind tower 405 is as high as practically possible. For example, in the case of a wind turbine, the moorings can be placed at a height that does not interfere with the rotating blades (not shown). As illustrated in FIG. 4, the pile 401, the buoyant structure and deck 402, and the wind tower and/or equipment 405 structurally form a cantilever beam, with moorings 404 providing the function of bracing. The structural members are so sized that the moorings 404 remain in tension. By using the techniques described above with regard to FIGS. 1-3, the moorings, the buoyant structure and deck 402 and the wind tower 405 can be restrained in each of the DOFs.

The moorings 404 and anchors 403 may be placed depending on the design. As illustrated in FIG. 4A, moorings 404 and anchors 403 are evenly spaced (e.g., at 90 degrees). In the example of FIG. 4B, three moorings 404 are shown with moorings spaced at 120 degrees.

Different mooring systems can be utilized. For example, a taut mooring system using synthetic ropes, metal chains or a combination of synthetic ropes/metal chains, and possibly other materials, that can be secured with vertically loaded anchors (VLAs) on the seabed. In other examples, a catenary mooring system using metal chains or a combination of synthetic ropes/metal chains, and possibly other materials, that can be secured with drag embedded anchors on the seabed.

In a taut mooring system, the moorings are tensioned such that their shape is essentially straight. In a catenary mooring configuration, the moorings are in a free-hang shape (catenary). Generally, in a taut mooring system, the mooring lines are pre-tensioned until they are taut, and the mooring lines terminate at an angle at the seabed (e.g., between about 30-45 degrees). As such, the anchor points in a taut mooring system are loaded by both horizontal and vertical forces.

Diagram 475 illustrates restraining the yaw motion of the FRP-monopile structure with moorings. As illustrated in diagram 475, there are two moorings 404 attached to each anchor 403 on the seabed. The other ends of the moorings 404 are attached, on the FRP-monopile structure (e.g., on the air can, on the monopile, on the deck/transition piece, . . . ) at different positions. Mooring attachment points can be on the air can or the pile itself, above or at or below the water line. In-line mooring hardware may be used for tightening the mooring lines, in order to maintain the necessary pre-tension in mooring lines. One such a case is the loosening of the tension in synthetic ropes due to creep and relaxation. Turbine utility and signal cables can also be attached to one or more of the moorings lines to minimize the motions of such cables. A moment arm is created as the extension of the mooring line does not pass through the center of the circular shaped structure. This is another mechanism of restraining the yaw motions of the structure.

If the water is not sufficiently deep, a mooring system may not be needed. In other words, the pile structure alone will be capable of resisting the external loads. On the other hand, additional levels of moorings (moorings at another elevation) may be used to secure the air can/pile structure if the water is very deep (the air can/pile structure is very long). According to some examples, the mooring systems described herein can also be retrofitted on an existing pile structure, to provide additional supports to ensure the overall structural integrity. There is an issue in existing offshore wind foundations with a single pile only (e.g., a monopile), where concerns are raised on their capabilities to resist environmental loads.

According to some examples, a wind turbine foundation may be installed by installing the mooring anchors, laying moorings, installing monopile and air can, attaching moorings on the pipe/air can and tensioning, mounting the turbine, installing the cable, and commissioning.

Figure 5:
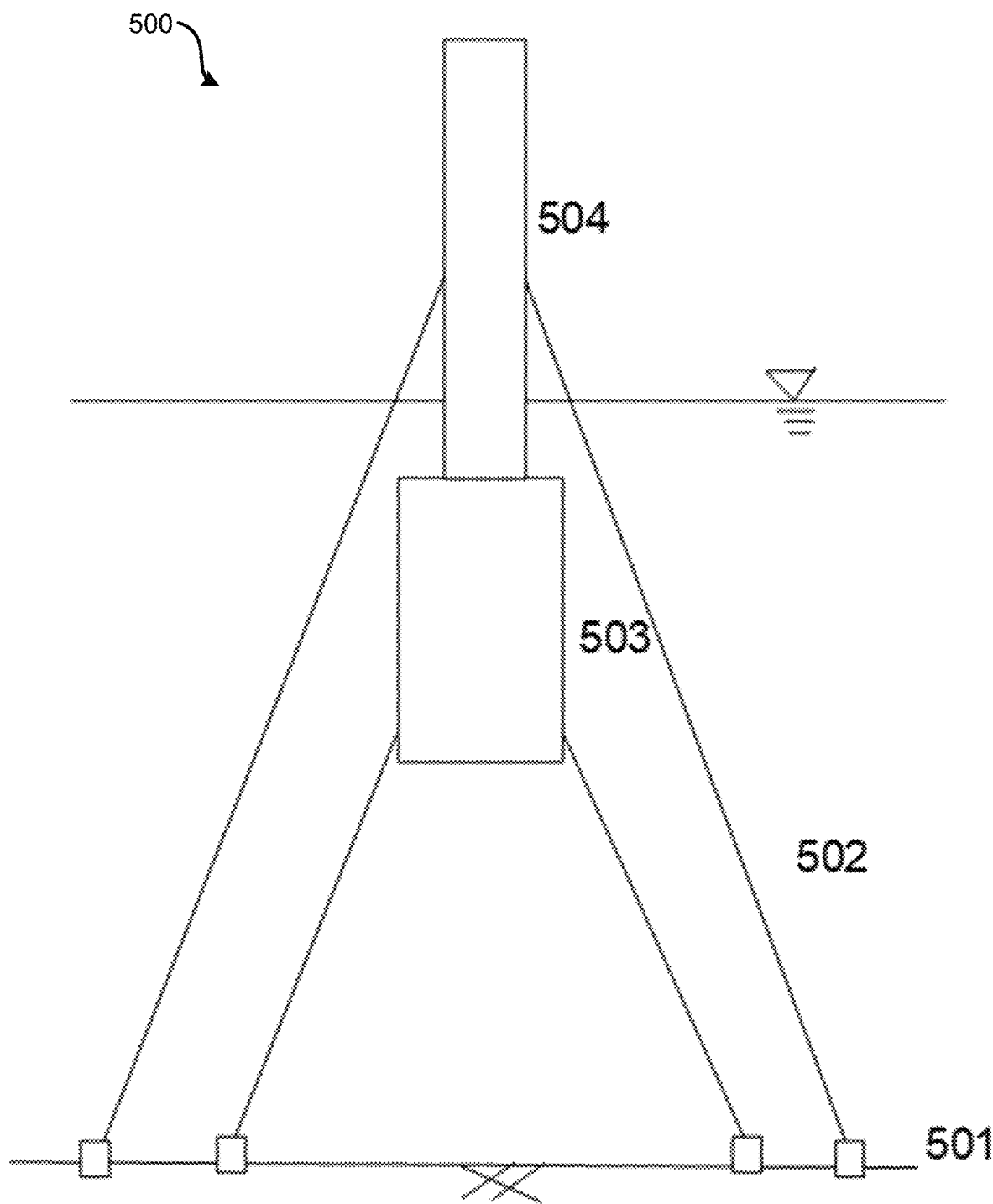
FIG. 5 illustrates connecting moorings to the buoyant structure and to structure/equipment mounted on top.

FIG. 5 illustrates connecting moorings to the buoyant structure and to structure/equipment mounted on top. As illustrated in FIG. 5, moorings 502 are at one of their ends connected to seabed anchors 501, and at the other ends to the buoyant structure and deck 503 for some and to the wind tower and/or electrical equipment 504 for others. Therefore, the moorings 502 are attached to the structure at two elevations. The wind turbine tower and/or electrical equipment 504 is mounted rigidly on top of the buoyant structure and deck 503. By using the techniques described above to design the moorings 502, the buoyant structure and deck 503 and the wind tower and/or electrical equipment 504 can be restrained in 6 DOFs. In some examples, the attachment elevation on the wind tower and/or electrical equipment 504 is as high as practically possible, as long as the moorings 502 do not interfere with the rotating blades in case of a wind turbine (blades not shown in the figure).

Figure 6A:
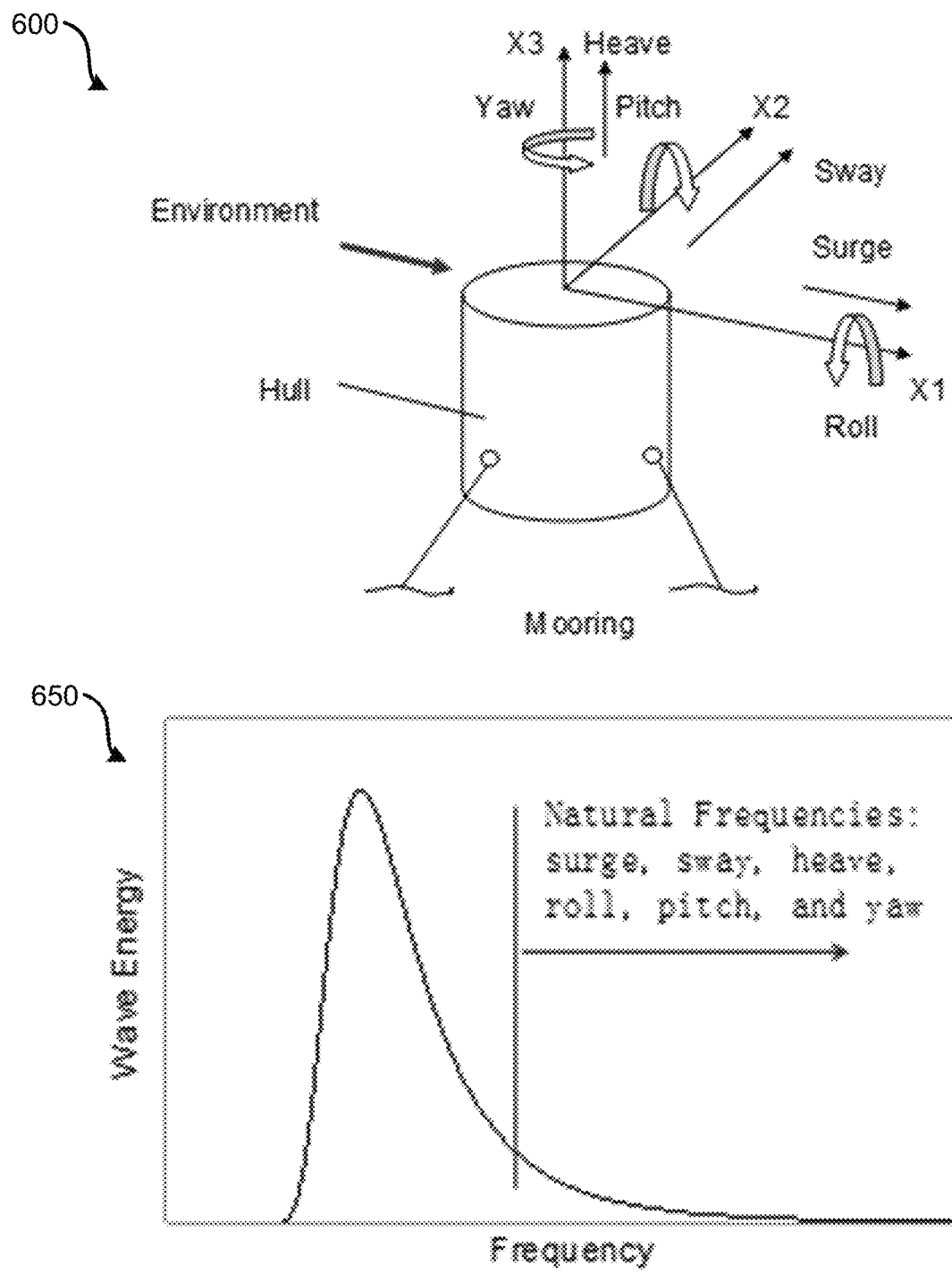
FIG. 6A shows 6 degree of freedoms (DOFs) motion of the hull of an offshore platform and the natural frequencies in the 6 DOFs motions for a fully restrained platform (FRP).
Figure 6B:
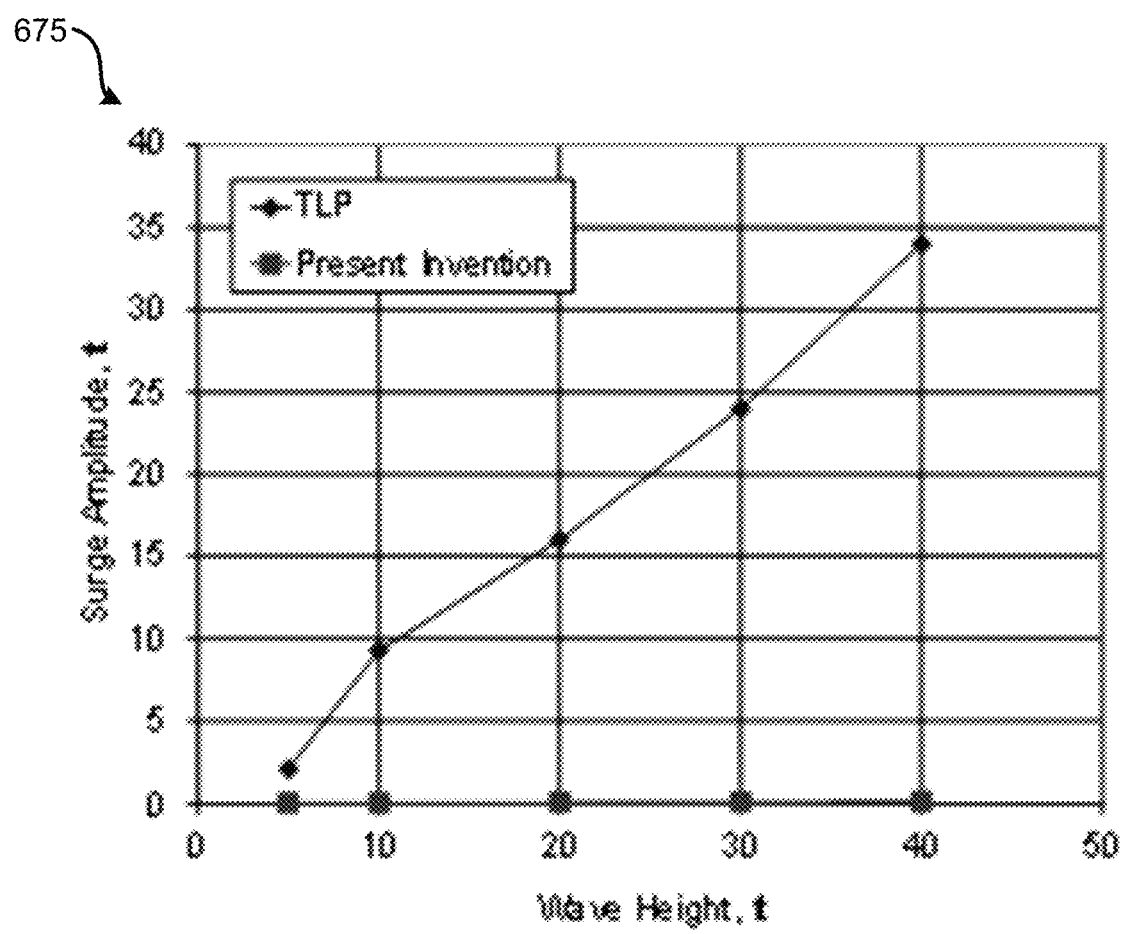
FIG. 6B shows a comparison of surge motions between the FRP and a tension-leg platform (TLP).

FIGS. 6A and 6B illustrates differences in a tension-leg platform and an FRP as described herein. Referring to FIG. 6A, illustration 600 shows 6 DOFs motion of the hull of an offshore platform. Plot 650 shows the natural frequencies in the 6 DOFs motions for the FRP as described herein. Plot 675 in FIG. 6B shows a comparison of surge motions between the FRP and a TLP.

Because of the high tension in the moorings of the motion controlled system, all of its 6 natural frequencies, for surge, sway, heave, roll, pitch, and yaw, are on the right side of the significant wave frequency (the peak in the plot 650 of FIG. 6A), where the wave energy is the largest.

A comparison of surge motions in waves is made between the motion-controlled system as described herein and a TLP, as is shown in plot 675 of FIG. 6B. As can be seen, the motion-controlled system as described herein is basically motionless in waves.

Figure 7:
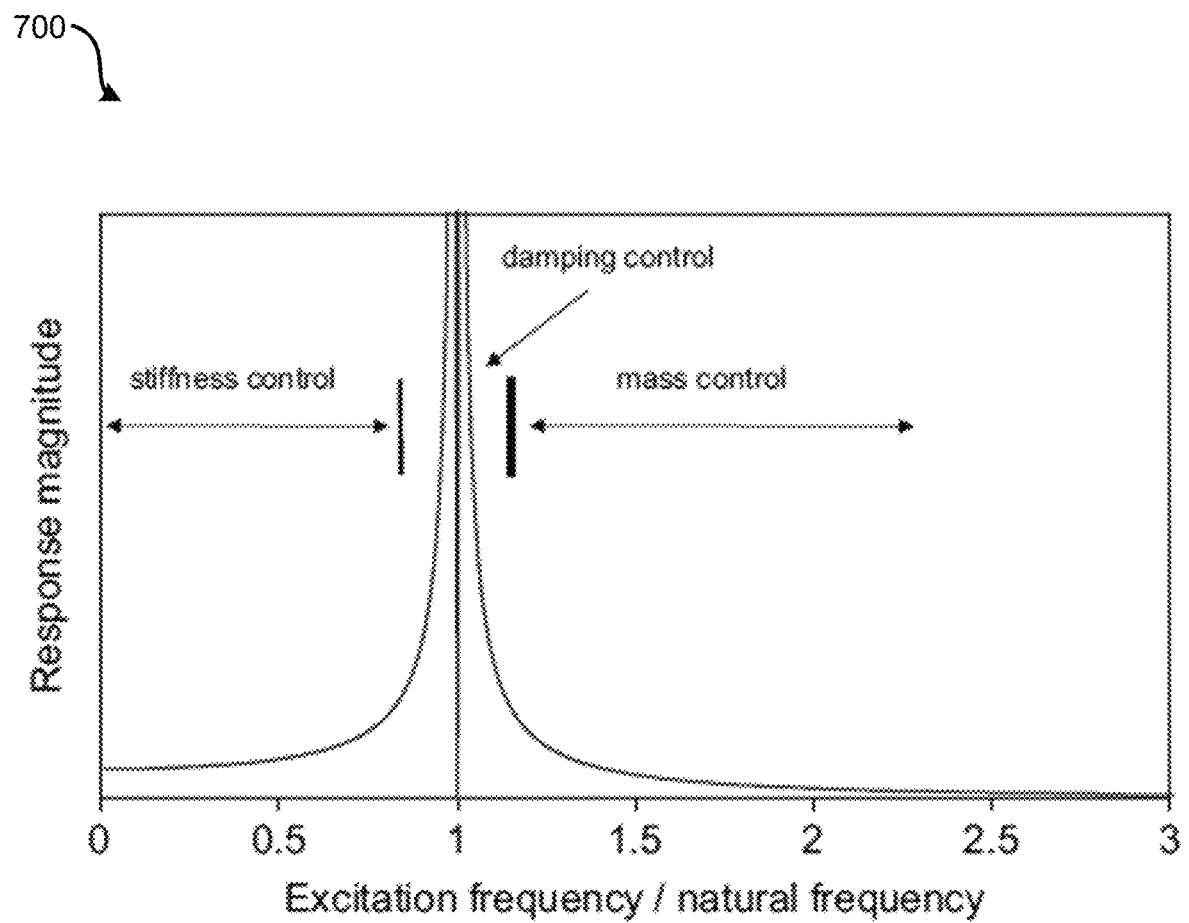
FIG. 7 illustrates the stiffness, damping, and mass-controlled frequency zones for the response of a mechanical resonator.

FIG. 7 illustrates the stiffness, damping, and mass-controlled frequency zones for the response of a mechanical resonator. The motion-controlled system described above uses the axial stiffness of the moorings to restrain motions in some examples, and both the axial and lateral stiffness in others. This system has been found to work well if the motions are controlled primarily by the stiffness of the system. A single-degree-of-freedom (SDOF) mechanical resonator can be used as a model to represent each degree-of-freedom (DOF) motion of a hull. This mechanical resonator consists of a mass, a spring, and a dashpot. How the mass will respond to a disturbance is dependent on the frequency of the excitation in relation to the natural frequency of the resonator. There are three frequency zones as is shown in FIG. 7. A fully restrained structure is designed such that the excitation frequency falls within the stiffness control zone, i.e., they are below the natural frequencies of the system. Note that the stiffness matters in each of the frequencies, but its effect is more prominent in the stiffness control zone. If the frequencies of the excitations are higher and are within the damping control zone, a phenomenon termed as resonance occurs and the motions of the hull could be large and unacceptable.

One example is that when the incoming waves have sum frequencies close to one of the natural frequencies of the platform (as a spring restrained rigid body, the hull has 6 natural frequencies corresponding to the motions in its 6 DOFs). The sum frequency wave loading could also excite the bending natural frequency of the wind tower. Another example is the aerodynamic loading when the blades rotate passing the wind tower. In view of the above, tuned mass dampers (TMDs) and tuned liquid dampers (TLDs), which have been used successfully on high rise buildings, can be mounted on the wind turbines to reduce their dynamic motions. This relates to the second method of the present invention.

The working principle of TMDs and TLDs is that the masses of these dampers are tuned such that their own natural frequencies are close to a target frequency for the dampers to function to absorb the vibrational energy of the main system. In this way, the motion magnitude of the main system will be reduced to a lower level. TLDs can be considered as a special case of TMDs with the mass being that of the liquids. The shape of the liquid tank, the amount of the liquid in the tank, and the actual liquid can be designed so that the intended function can be achieved.

The underlying idea of the second method is therefore to attach the tuned mass damping systems on the offshore wind turbines, in order to reduce its dynamic motions and to alleviate the dynamic forces in the system's moorings. This tuned mass damping system comprises a tuned mass damper (TMD) and a tuned liquid damper (TLD), so that more than one frequency can be targeted at. The mechanism is explained below.

Figure 8:
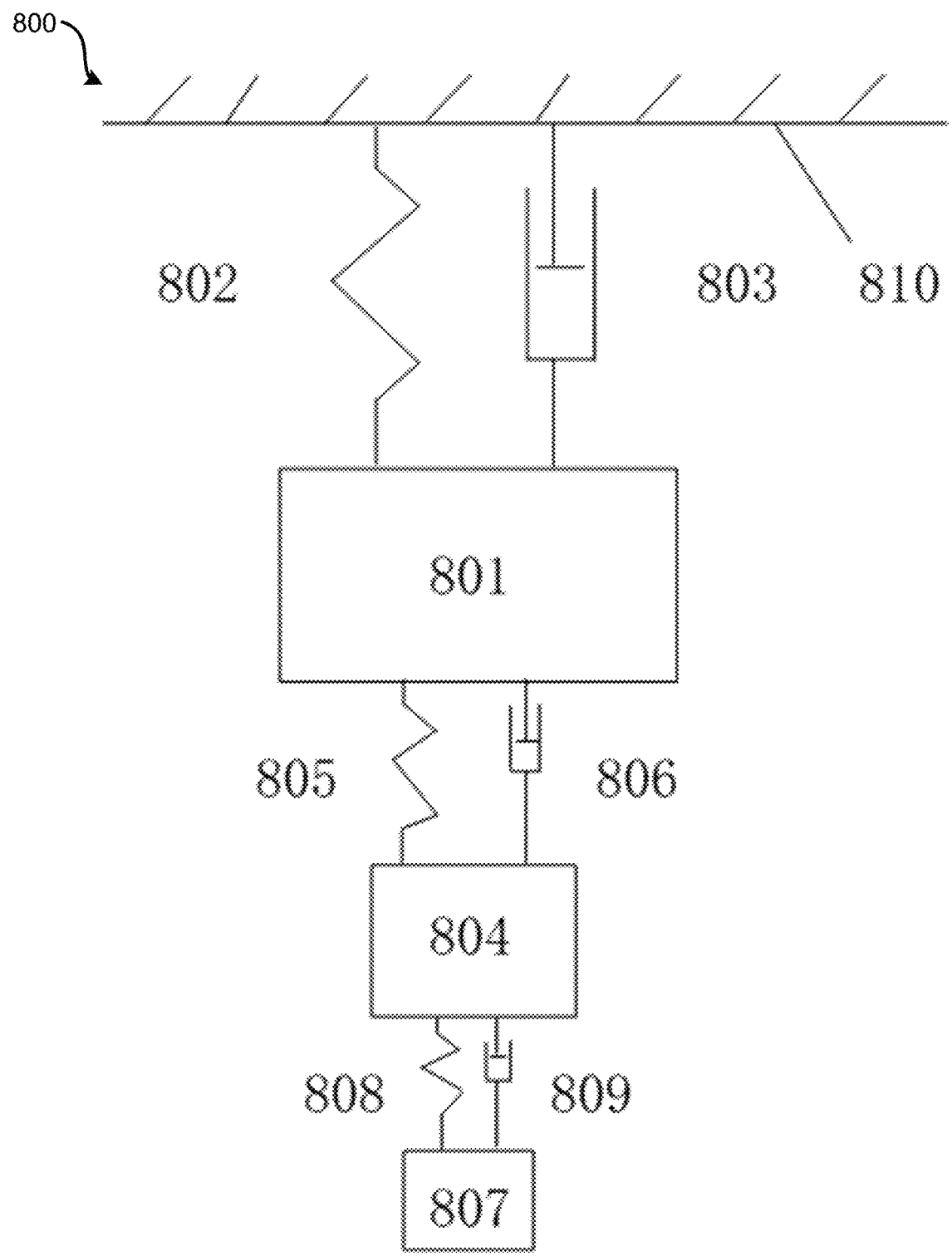
FIG. 8 illustrates an offshore wind turbine has a mass, a spring, and a dashpot, to represent one of its natural frequencies.

FIG. 8 illustrates a system 800 for an offshore wind turbine that has a mass 801, a spring 802, and a dashpot 803, to represent one of its natural frequencies. The tuned mass damping system has a primary mass 804, a spring 805 and a dashpot 806. The mass 804, such as a spherical tank, contains liquids (forming a secondary mass), which are represented by a mass 807, a spring 808, and a dashpot 809. This mass-spring-dashpot system is mounted on a foundation 810.

As is shown in FIG. 8, the entire system will have three natural frequencies: one is for the entire system (denoted as $f_1$), and two are introduced by the tuned mass damping system (denoted as $f_2$ and $f_3$). The two natural frequencies of the damping system are tuned such that $f_2$ (corresponding to the primary mass 804) is close to $f_1$, and that $f_3$ targets at the same or a different frequency, such as another natural frequency of the system or one of the excitation frequencies, such as the dominating wave frequency for a 100-year hurricane in the Gulf of Mexico.

Tuning can be achieved by changing the masses (804 and 807) and/or the springs (805 or 808) and/or the dashpots (806 and 809). According to some examples, an optimized specification for $f_2$ and $f_3$ as well as the values for damping from dashpots 806 and 809 can be found by computer simulation, which will give the most effective dampening result: the least motions of the platform. When the platform experiences a disturbance, masses 804 and 807 will respond and will activate the intentional dashpots 806 and 809 to dissipate the energy.

FIG. 9 illustrates an eigenvalue equation 900 to obtain natural frequencies. The natural frequencies of the system illustrated in FIG. 8 can be obtained by solving the eigenvalue equation 900 (a determinant equal to zero) illustrated in FIG. 9. The correspondence between the symbols in FIG. 9 and the symbols in FIG. 8 is as follows: (1) $M_1$, $M_2$, and $M_3$ in FIG. 9 are the values of masses 801, 804, and 807 in FIG. 8, respectively, and (2) $K_1$, $K_2$, and $K_3$ in FIG. 9 are the stiffness values of springs 802, 805, and 808 in FIG. 8, respectively. The solution to the eigenvalue equation, which can be obtained readily with a computer code, is three natural frequencies: $\omega_1$, $\omega_2$, and $\omega_3$, which are related to $f_1$, $f_2$, and $f_3$ by $\omega_i=2\pi f_i$ with i=1, 2, 3.

Referring now to FIG. 8, the TMD (represented by mass 804 along with mass 807, spring 805 and dashpot 806) can be either a simple pendulum or a physical pendulum. For the former, its natural frequency is given by $f=\sqrt{g/L}/2\pi$, where g is the gravitational acceleration and L is the length of cables supporting the mass. The TLD (represented by mass 807, spring 808 and dashpot 809) is formed by liquids sloshing in a tank of any practical shape, such as a rectangular prism or a sphere. The liquids can be water or a mixer of water and viscoelastic material. For a rectangular tank, the natural frequency expression is: $f=\sqrt{gh}/2L$, where g is the gravitational acceleration, h is the depth of the liquids in the tank, and L is the length of the tank.

Figure 10:
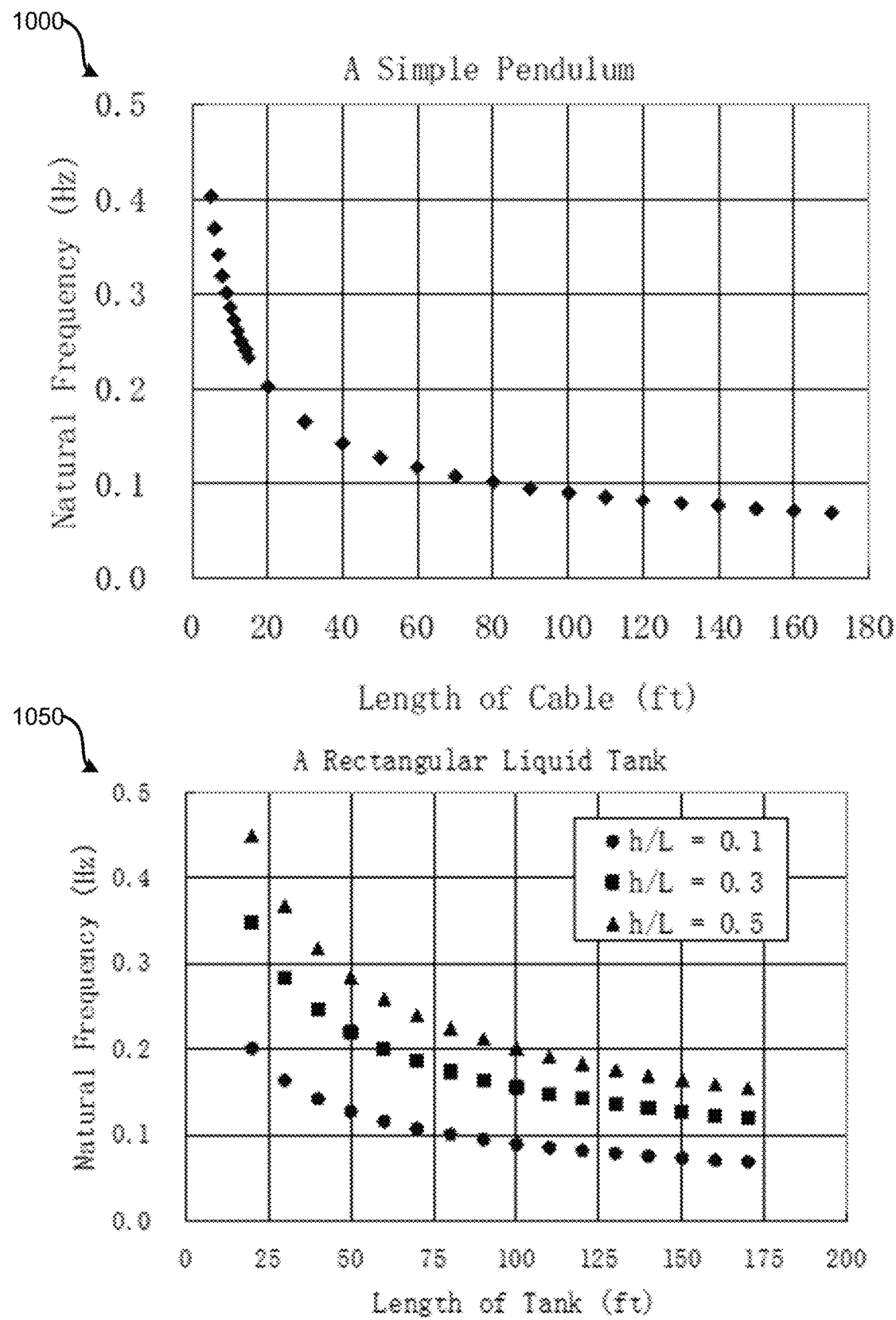
FIG. 10 illustrates natural frequencies for a simple pendulum and for liquids sloshing in a rectangular tank.

FIG. 10 illustrates natural frequencies for a simple pendulum and for liquids sloshing in a rectangular tank. Plot 1000 and plot 1050 demonstrate using the TMDs and TLDs for reducing dynamic motions of wind turbines, since the geometric dimensions (the cable lengths and the tank sizes in particular) for the target frequencies are practical in view of the dimensions of a wind turbine. For example, a pendulum with a 9-ft. (2.7 m) long cable will have a natural frequency of 0.3 Hz. An 80-ft. (24.4 m) long tank filled with 8-ft. (2.4 m) liquids will give a natural frequency of 0.1 Hz. The values of these frequencies are similar to that for the sum frequency of ocean waves.

Plot 1000 and plot 1050 illustrated in FIG. 10, along with the eigenvalue equation in FIG. 9, can be used to size the TMDs and the TLDs to the target frequencies. The vertical motion frequency of the TMD can be sized by: $f=\sqrt{K/M}/2\pi$, where K is the axial stiffness of the cables, AE/L, with A the total cross-sectional areas of the cables, E the Young's modulus, and L the cable length. M is the mass. Therefore, both the pendulum motion and the vertical motion frequencies can be sized simultaneously. This tuned mass damping system can be mounted on a wind turbine in such a way that any motions of the structure will activate the damping system.

Figure 11:
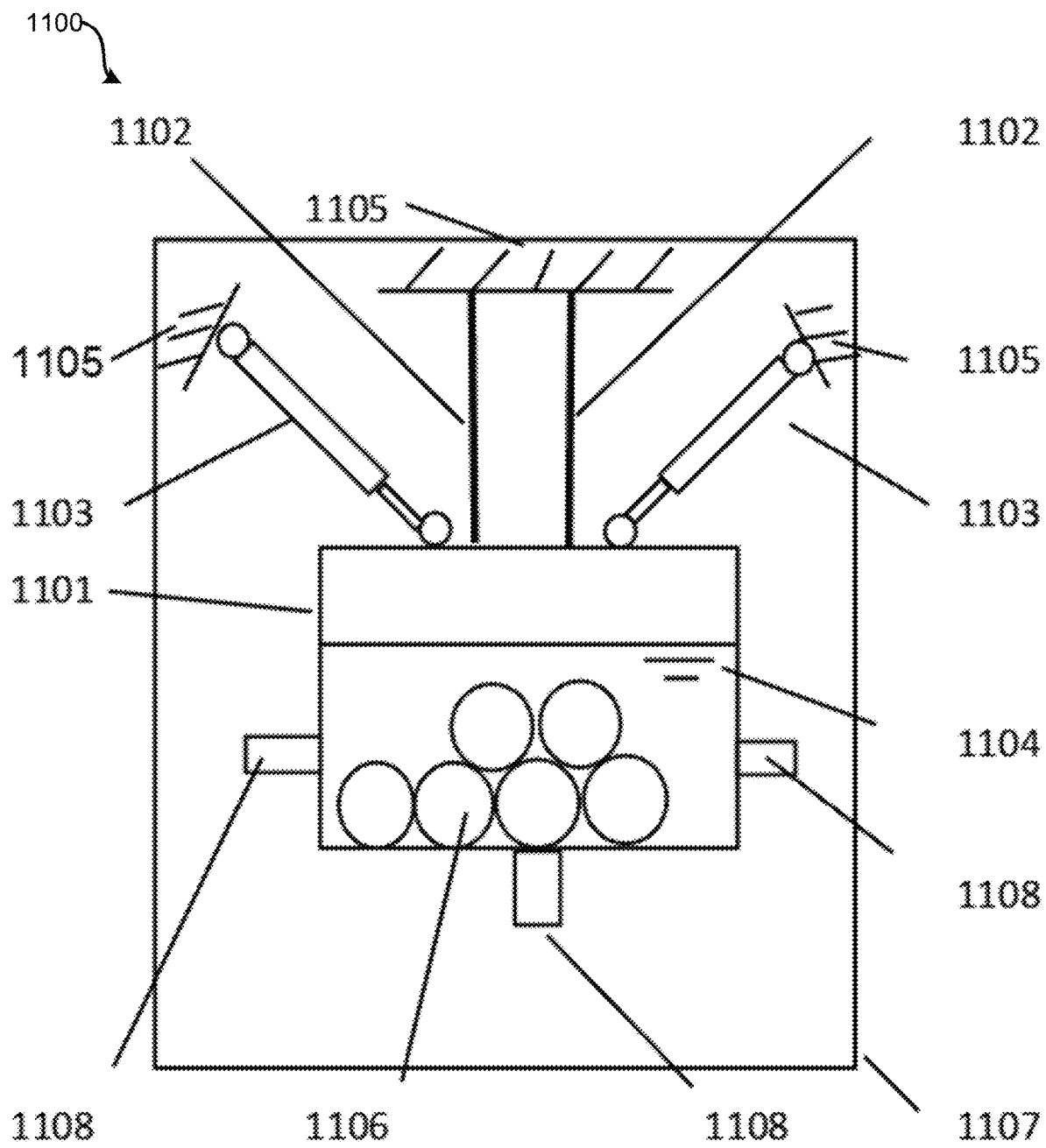
FIG. 11 illustrates a tuned mass damping system.

FIG. 11 illustrates a tuned mass damping system. As illustrated, the tuned mass damping system 1100 as illustrated comprises: (1) a prismatic tank 1101, to generate inertial energy when in motion, (2) the cables 1102 to support the tank 1101 and to provide stiffness, and (3) the hydraulic cylinders 1103 to dissipate energy. The tank 1101 contains liquids 1104, forming a TLD which can also be tuned. The other ends of the cables 1102 and of the hydraulic cylinders 1103 are attached to an intermediate support structure 1107 at positions 1105. Solid mass spheres 1106 are placed inside liquids 1104 to enhance energy dissipating performance of the TLD. The stop pins 1108, projecting from the sides of the tank 1101, serve as a safe to limit the movement of the tank 1101.

Figure 12:
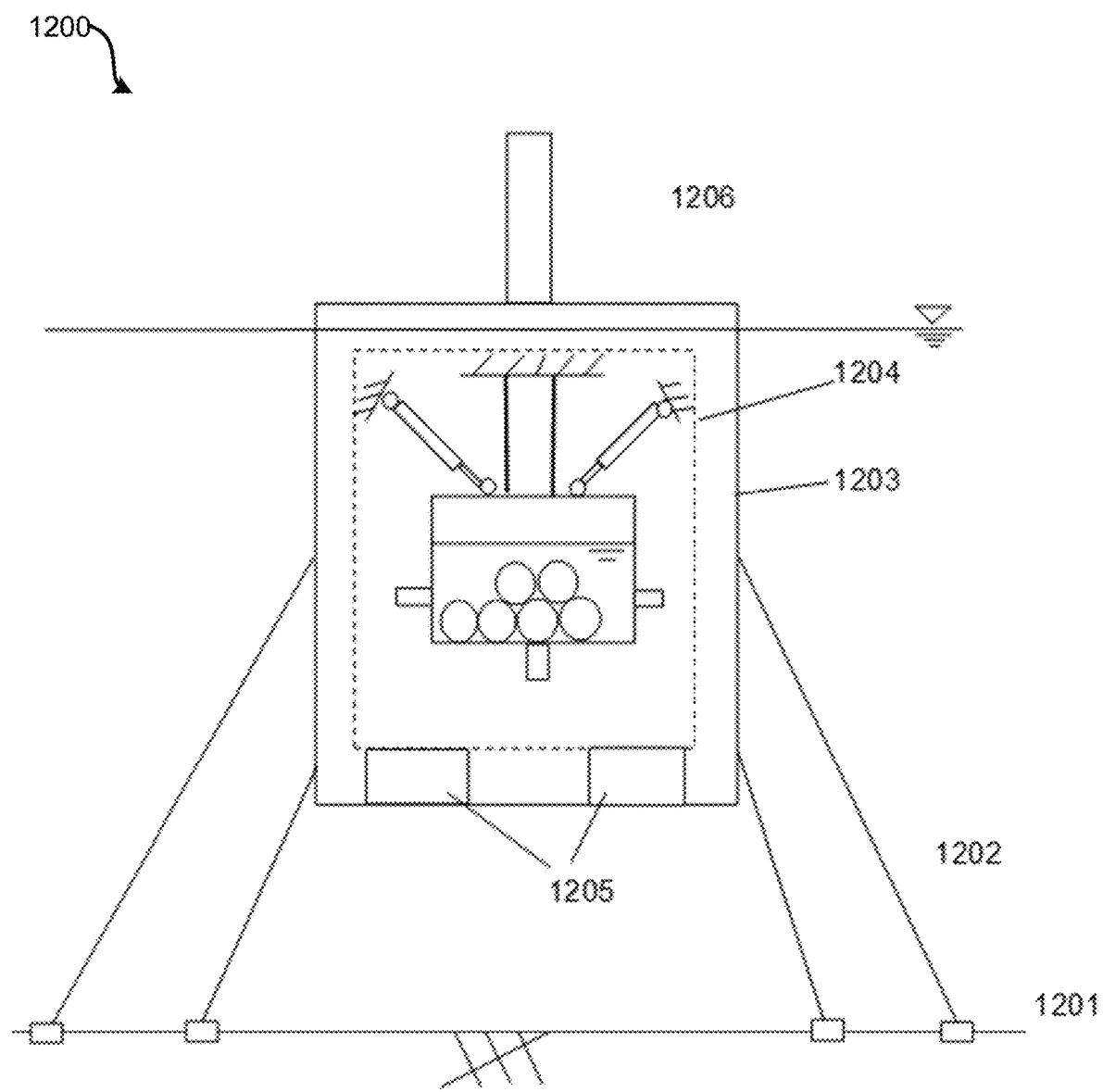
FIG. 12 illustrates a wind turbine mounted to a tuned mass damping system.

FIG. 12 illustrates a wind turbine mounted to a tuned mass damping system. According to some configurations, the tuned mass damping system in FIG. 11 can be mounted inside and/or on and/or beneath the hull. As illustrated in FIG. 12 the tuned mass damping system 1204 (represented by a dashed-line box) is mounted inside the hull and deck(s) of a wind turbine 1203 in a body of water. The dampers 1204 are placed on supports 1205. The hull 1203 is secured by the moorings 1202. The foundation anchors 1201 on the seafloor connected to the moorings 1202 will sustain the mooring loads. The wind turbine and/or electrical equipment 1206 is mounted on the hull and deck(s) 1203.

Figure 13:
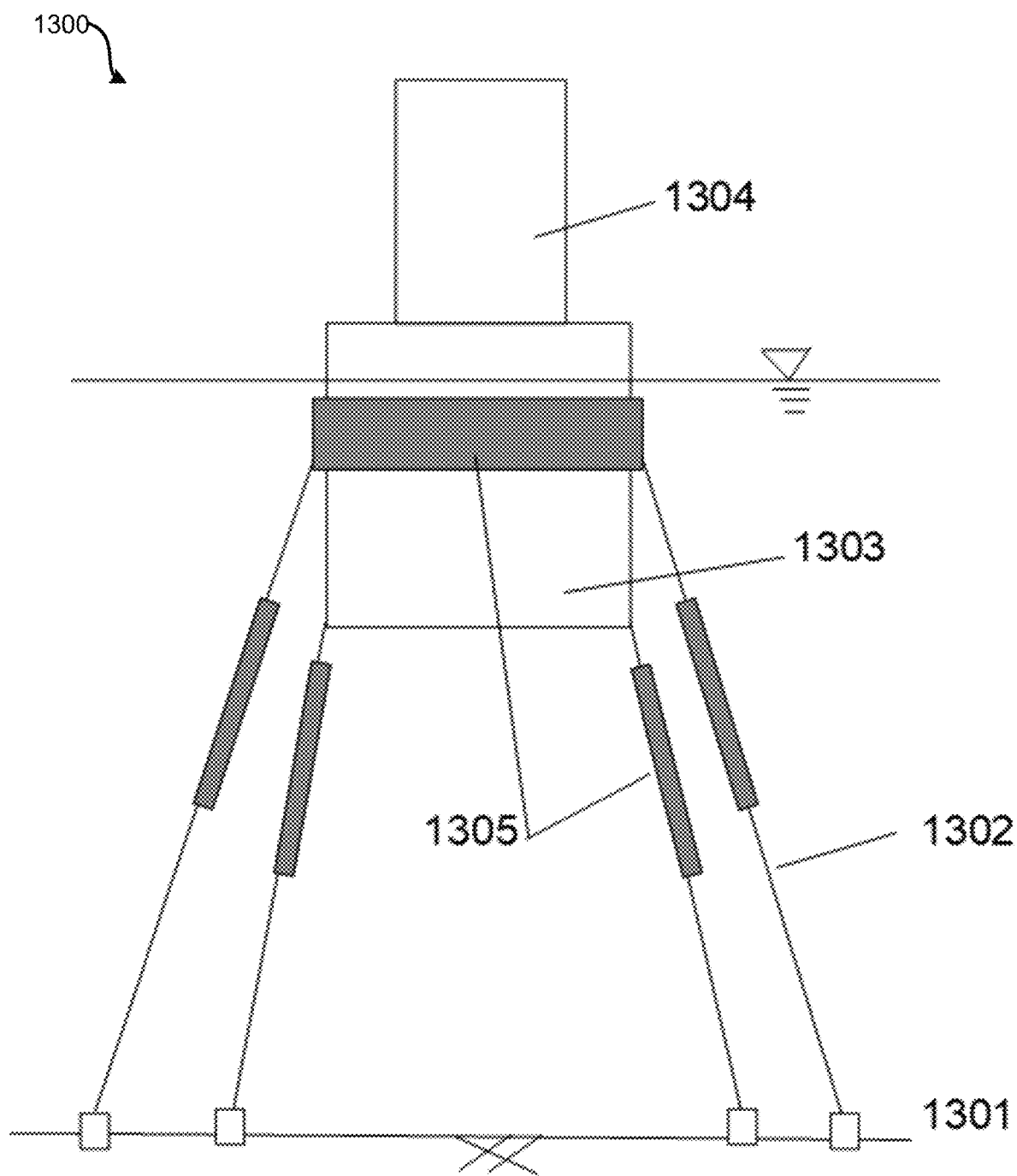
FIG. 13 illustrates the vortex-induced vibration suppression devices attached to the moorings and the hull of an FRP.

FIG. 13 illustrates vortex-induced vibration suppression devices. When ocean currents encounter tubular structures, they can form vortices due to flow separation at the structures. When the vortices are shed, they exert dynamic forces on the structures, excite them into motion, and cause fatigue damages. This phenomenon is called vortex-induced vibration (VIV). Field experience of the offshore oil and gas industry indicates that mitigating hardware is needed in order to suppress VIV. Since the buoyant structure is stiffness controlled, it will not move much. If the vortex-shedding force on the hull is large, mitigation measures are still warranted in some examples. The long, tubular mooring lines are very flexible. VIV of the moorings can impact the motions of the hull and any structures which are associated with the offshore platform and have natural frequencies close to the VIV and/or vortex-shedding frequencies. In the same flowing fluids, inclined cylinders do have less VIV than vertical mounted ones. However, mitigating measures may still be necessary. VIV suppression devices helical strakes and streamlined fairings can be used on the moorings to reduce the motions. This is the third method for minimizing the motions of the offshore wind turbines.

As illustrated in FIG. 13, moorings 1302 are at one of their ends connected to seabed anchors 1301, and at the other ends to the buoyant structure and deck(s) 1303 at one elevation for some and at another elevation for others. The wind turbine tower and/or structures and equipment 1304 are mounted rigidly on top of the buoyant structure and deck(s) 1303. VIV suppression hardware 1305 is attached to moorings 1302 along the longitudinal direction of the moorings 1302. The mitigating devices 1305 are also attached to the buoyant structure and deck(s) 1301.

Figure 14:
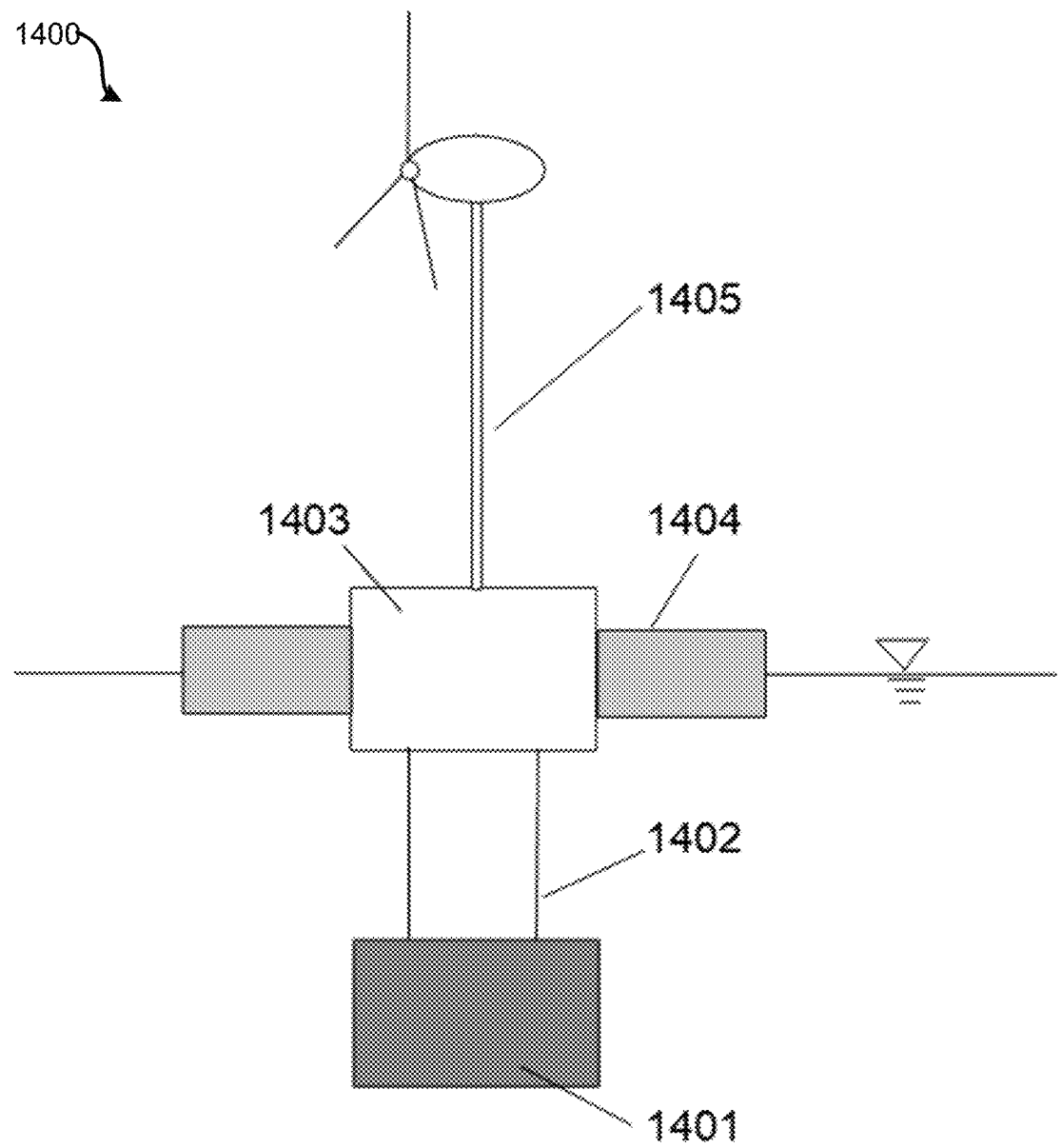
FIG. 14 illustrates an example of an offshore wind turbine without moorings attached while with temporary structures and equipment during transportation and installation.

FIG. 14 illustrates an example of an offshore wind turbine without moorings attached while with temporary structures and equipment during transportation and installation. There are significant cost savings if the wind turbine can be mounted on the platform at quayside. However, due to the high vertical center of gravity (VCG) after the wind turbine is mounted on the platform, the risk of capsizing is high when transporting such a structure to the site for installation, such as in a wet tow. The environmental loading along with the motions caused by the disturbance could overturn the entire structure.

In addition, before the structure is secured with moorings during installation, hydrostatic stability is a concern due to the high VCG. According to some configurations temporary installation/transportation tools and equipment can be used to mitigate the risk of capsizing. In some examples, temporary weights can be mounted beneath the hull during transportation and installation, to lower the VCG. These weights can also be the gravity anchors for the moorings. For some examples, the entire offshore wind turbine can be towed to the installation site with the mooring and anchors attached, whole or as a part. In addition, the water plane area of the hull can be augmented with air cans (hollowed and buoyant cans) and/or other floats attached on the perimeter of the hull at the waterline.

As illustrated in FIG. 14, the buoyant structure and deck(s) 1403 are attached with air cans and/or floats 1404 at the water line level. One or more weights or gravity anchors 1401 can be attached beneath the hull and deck(s) 1403, which are supported by truss members or moorings 1402. A wind turbine tower along with a nacelle and a rotor hub 1405 are mounted rigidly on top of the buoyant structure and deck(s) 1403. The entire structure can be wet towed to the installation site. Once moorings (not shown) lock off the platform and the turbine, the temporary structures and equipment (the air cans and/or floats 1404, the weights 1401, and the support structures 1402) will be removed for future use, such as assembling, transporting, and installing other wind turbine units, maintaining operating units, or decommissioning.

According to some configurations, the assembly procedure is includes fabricating the hull, installing a temporary structure, and installing the wind tower and the rotary nacelle assembly (RNA). In some examples, the transportation and installation procedure includes installing seabed anchors (including those used as temporary weights during transportation and installation, if any), installing moorings, transporting to site the hull and deck(s) with the wind turbine mounted in a wet tow, securing the platform and turbine with pre-installed moorings, and removing the temporary transportation and installation equipment.

Figure 15:
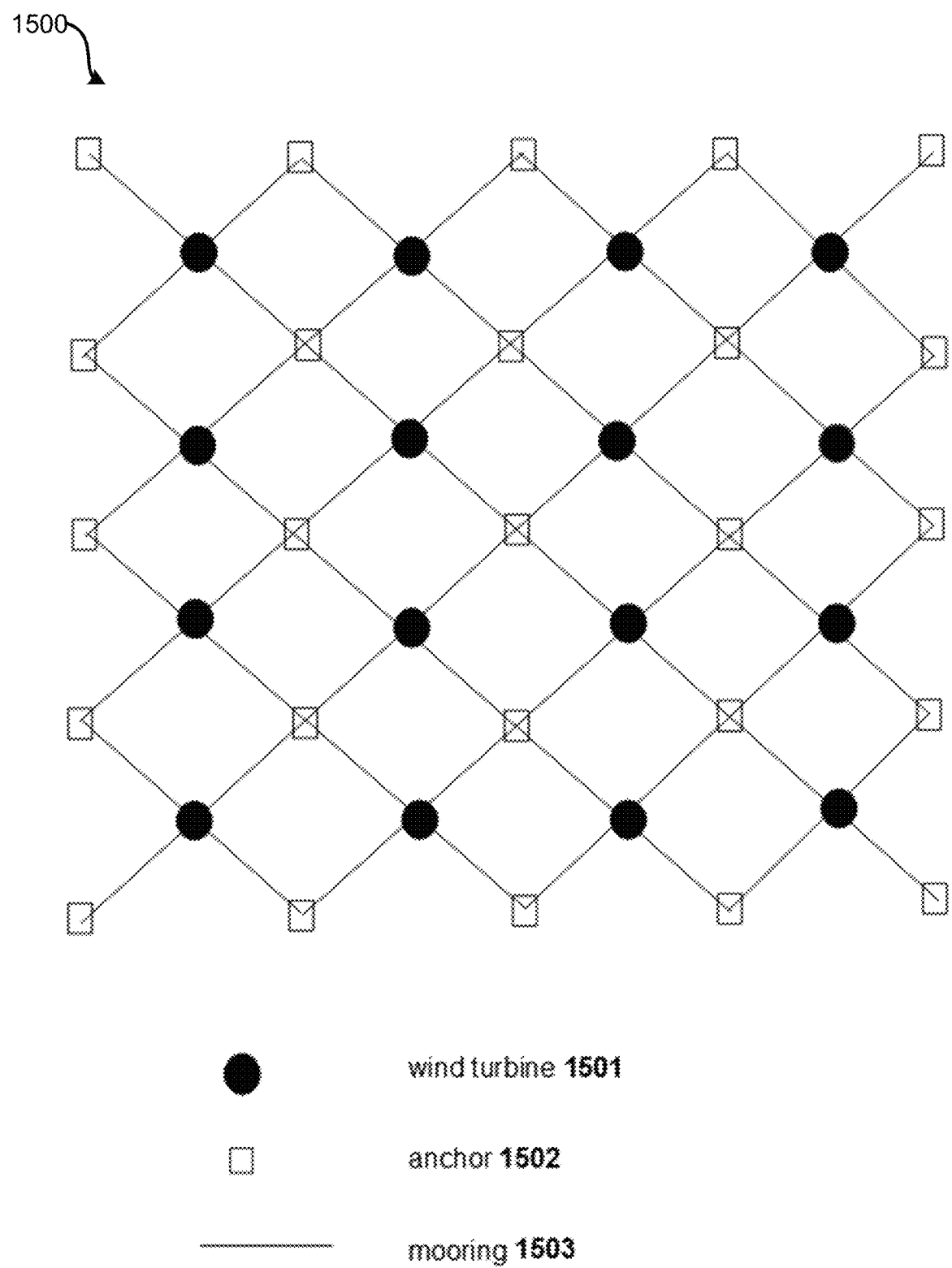
FIG. 15 illustrates an offshore wind farm with 16 turbine units laid out in a grid pattern.

FIG. 15 illustrates an offshore wind farm 1500 with 16 turbine units laid out in a grid pattern. In some configurations, when an offshore wind turbine is selected for an offshore wind farm with multiple units, the design, on an aggregate level, can be optimized by sharing the same seabed anchor by multiple moorings from the same and/or adjacent unit(s). As a result of the optimization, the number of anchors can be reduced, and significant cost savings can be achieved. As illustrated, moorings from the same and/or multiple units may be attached to the same anchor.

Referring now to FIG. 15, the offshore wind farm 1500 with 16 turbine units (more or less may be used) is laid out in a grid pattern. The moorings 1503 secure the turbine units 1501 to seabed anchors 1502. In this example, there are 16 turbine units in a 4 by 4 array. Assume each unit is secured with 4 moorings. If the 4 mooring unit is designed separately, 64 anchors would be needed. When the moorings for adjacent units share the same anchor as is shown in FIG. 15, only 25 anchors are needed. A saving of 39 anchors is achieved. Note also that each of the 4 corner anchors secures one mooring, at the sides secures two moorings, and in the middle secures four moorings Based on the foregoing, it should be appreciated that technologies for minimizing movement of an offshore wind turbine have been presented herein. The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the true spirit and scope of the present invention, which is set forth in the following claims.

What is claimed is:

1. A method to restrain motions of a platform that hosts a wind turbine structure or an offshore substation, comprising,
    temporarily mounting one or more weights to a buoyant structure coupled to the platform during transportation of the platform, wherein the one or more weights lower a vertical center of gravity (VCG);
    attaching moorings at one or more elevations of the platform; and
    rotating individual moorings about a respective attachment at an angle to create a moment arm, wherein attaching the moorings and rotating the individual moorings restrain surge, sway, heave, roll, pitch, and yaw motions.

2. The method of claim 1, further comprising clamping moorings at a half-length to clear the moorings from a seabed.

3. The method of claim 1, wherein the one or more weights are temporarily mounted to the buoyant structure during installation of the platform.

4. The method of claim 1, further comprising attaching a second end of the individual moorings to a corresponding anchor.

5. The method of claim 4, wherein each of the corresponding anchors are attached to a seabed.

6. The method of claim 1, wherein the wind turbine structure is mounted in a wet tow during at least a portion of the transportation of the platform.

7. The method of claim 1, wherein temporarily mounting one or more weights further comprises temporarily mounting the one or more weights beneath a hull.

8. The method of claim 1, wherein the wind turbine structure is mounted on the platform at quayside.

9. The method of claim 1, wherein the one or more weights are gravity anchors associated with the moorings.

10. The method of claim 1, further comprising installing the wind turbine structure and a rotary nacelle assembly on the platform prior to transportation of the platform.

11. A method to restrain motions of a platform that hosts a wind turbine structure or an offshore substation, comprising,
    temporarily mounting one or more weights to a buoyant structure coupled to the platform during transportation of the platform, wherein the one or more weights lower a vertical center of gravity (VCG);
    attaching moorings at one or more elevations of the platform; and
    rotating individual moorings about a respective attachment at an angle to create a moment arm, wherein attaching the moorings and rotating the individual moorings restrain surge, sway, heave, roll, pitch, and yaw motions;
    wherein the platform includes:
        a buoyant structure coupled to the platform;
        at least one of a wind turbine structure or an offshore substation;
        one or more anchors attached to a seabed; and
        one or more moorings.

12. The method of claim 11, further comprising clamping moorings at a half-length to clear the moorings from a seabed.

13. The method of claim 11, wherein the one or more weights are temporarily mounted to the buoyant structure during installation of the platform.

14. The method of claim 11, further comprising attaching a second end of the individual moorings to one or more anchors.

15. The method of claim 14, wherein the one or more anchors are attached to a seabed that is between a depth of about forty meters and two hundred meters under a surface of water.

16. The method of claim 14, wherein the one or more anchors are attached to a seabed that is between a depth of about twenty meters and one hundred twenty meters under a surface of water.

17. A method to restrain motions of a platform that hosts a wind turbine structure or an offshore substation, comprising,
    temporarily mounting one or more weights to a buoyant structure coupled to the platform during transportation of the platform, wherein the one or more weights lower a vertical center of gravity (VCG);
    attaching moorings at one or more elevations of the platform; and rotating individual moorings about a respective attachment at an angle to create a moment arm, wherein attaching the moorings and rotating the individual moorings restrain surge, sway, heave, roll, pitch, and yaw motions;
wherein the platform includes:
   a monopile that includes a first end embedded into a seabed, the platform coupled to the structure;
   at least one of a wind turbine structure or an offshore substation; and
   a buoyant structure that is integrated into the monopile.

18. The method of claim 17, further comprising clamping moorings at a half-length to clear the moorings from a seabed.

19. The method of claim 17, wherein the buoyant structure is an air can.

20. The method of claim 17, wherein the moorings are tubular, and include vortex induced vibration suppression hardware to mitigate vortex-induced vibration.

* * * * *